United States Patent Office 3,559,248
Patented Feb. 2, 1971

3,559,248
DEVICE FOR APPLYING PRINTED FOILS
TO MOLDED ARTICLES
Günther Stockmann, Uchte, Germany, assignor to Dr.
Ing, Fritz Sommer NACHF, Ludenscheid, Germany
Filed Mar. 22, 1968, Ser. No. 715,408
Claims priority, application Germany, Mar. 25, 1967,
St 26,668
Int. Cl. B29c *24/00;* B29d *3/00*
U.S. Cl. 18—36                                3 Claims

ABSTRACT OF THE DISCLOSURE

An apparatus for transferring a printed foil from the surface of a first member within close tolerance to a predetermined portion of the surface of a second member. The members constitute a matrix and a patrix, the second member preferably being the matrix, and the second member is part of a mold such as an injection mold. The first member has a depression in the surface thereof having an outline corresponding to the outline of the foil and suction means communicating with the depression for holding the foil within the depression. An electrostatic charging means is partly located within the depression for charging the foil held within the depression. Means are provided for moving the members relative to each other so as to juxtapose the positioned foil with the area on the second member to which the foil is to be transferred and pneumatic pressure means are provided in communication with the depression for blowing the foil toward the second member.

BACKGROUND OF THE INVENTION

The present invention relates to apparatus for applying printed foils in a predetermined position on the surface of molded articles, particularly articles formed of synthetic, generally thermoplastic, materials.

It has been proposed to apply decorative sheets, indicia and the like to thermoplastic articles by inserting a foil carrying such indicia into the mold in which the article is to be formed. It is necessary thereby to charge the foil with an electrostatic charge prior to insertion of the foil into the mold and such charging is carried out by means of an auxiliary device. Such electrostatic charge of the foil is required to maintain the foil in the desired location within the mold and to prevent dislocation of the foil upon introduction of the synthetic material into the mold. The electrostatic charging of the foil can be carried out outside the mold, prior to insertion of the foil or within the mold. However, in any case, it is extremely difficult to arrange the foil within the mold, particularly for purposes of mass production, so that the foil will always be located at exactly the same surface position of the mold and thus will be reliably transferred to the identical surface portion of the series of articles which are to be molded.

It is an object of the present invention to overcome the above-described difficulty and to provide a simple and economical apparatus which will permit locating of the indicia-carrying foil, sheet or the like at exactly the desired portion of the surface of the molded article.

SUMMARY OF THE INVENTION

With the above and other objects in view, the present invention contemplates a method of transferring a sheet from the surface of a first member to the complementary surface of a second member, wherein one of the members is a matrix and the other member is a patrix, which method comprises the steps of locating the sheet in a predetermined position on one of the surfaces, arranging the members in complementary relationship with the surfaces adjacent to each other, and transferring the sheet from the one surface to the juxtaposed portion of the other of the surfaces. The second member, i.e., the member including the surface to which the sheet is transferred, preferably forms part of an injection mold. The sheet is preferably held in the predetermined position on the one surface by applying suction to the sheet and the transfer to the other surface is facilitated by applying pneumatic pressure, and the holding of the sheet on the other of the surfaces is then further assured by electrostatic charging of the sheet.

The present invention also contemplates an apparatus for carrying out the above-described method, which apparatus comprises a matrix member and a patrix member having complementary internal and external surfaces, means for removably holding a sheet against a selected portion of one of the surfaces, and means for transferring the sheet from the selected portion of the one surface to the juxtaposed portion of the other of the surfaces. Preferably, one of the surfaces, i.e., the surface on which the sheet is first located, forms part of the patrix member.

According to preferred embodiments of the present invention, the means for removably holding the sheet include suction means cooperating with the selected portions of the surface for holding the sheet thereagainst.

Preferably, the selected portion of the one surface on which the sheet is first held is formed with a depression into which the sheet fits and with openings within the depression and the means for removably holding the sheet include suction means operatively associated with the openings for applying suction to the sheet located in the depression and thereby holding the sheet on the selected portion of the one surface.

Furthermore, the means for transferring the sheet may include pneumatic pressure means operatively associated with the openings for applying pneumatic pressure against the sheet in the direction from the one surface towards the other of the surfaces, thereby facilitating the transfer of the sheet. In addition, electrostatic charging means are preferably provided and at least partly located within the depression for electrostatically charging the sheet located therein prior to transfer thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

According to the present invention, prior to the molding of the article to which printed foil or other indicia are to be applied, an auxiliary member is brought into contact with a portion of the article mold, for instance an injection mold, and the foil or the like which is to be applied to the article is removably attached to a portion of the face of the auxiliary member which is then juxtaposed with a portion of the article mold so that the indicia-carrying sheet or foil will be in contact with the portion of the article mold from which such foil or the like is to be transferred to the surface of the article which is to be molded. The foil or the like is then transferred to such surface portion of the article mold and thereafter, upon molding the article in such a mold, the foil will be adhered to exactly the desired portion of the surface of the thus-molded article. Preferably, the portion of the mold to which the foil or the like is to be adhered and the auxiliary member from which such foil or the like is to be transferred to the mold portion are in a patrix-matrix or matrix-patrix relationship.

It has been found advantageous to hold the sheet, foil or other member which is to be thus transferred on the desired surface portion of the auxiliary member by suction and to facilitate transfer to the juxtaposed surface portion of the article mold by replacing suction with pneumatic pressure, combined with assuring maintenance of the desired position of the foil or the like at the surface of the article mold by electrostatic charging of the foil prior or during transfer from the auxiliary member to the surface of the article mold.

For carrying out the method of the present invention, an apparatus or device is provided which includes the above mentioned auxiliary member formed with conduits terminating in the surface portion of the auxiliary member at which initially the foil or the like is to be held and which conduits serve to apply suction and later to apply pneumatic pressure to the foil or the like.

The surface portion of the auxiliary member at which the foil or the like is to be located is preferably formed by a depression in the surface of the auxiliary member. Furthermore, it is advantageous to locate in the surface of the depression a metal strip connected to a high-voltage source and serving to supply an electrostatic charge to the foil or the like when the same is located at the depressed surface portion.

Figure 1:
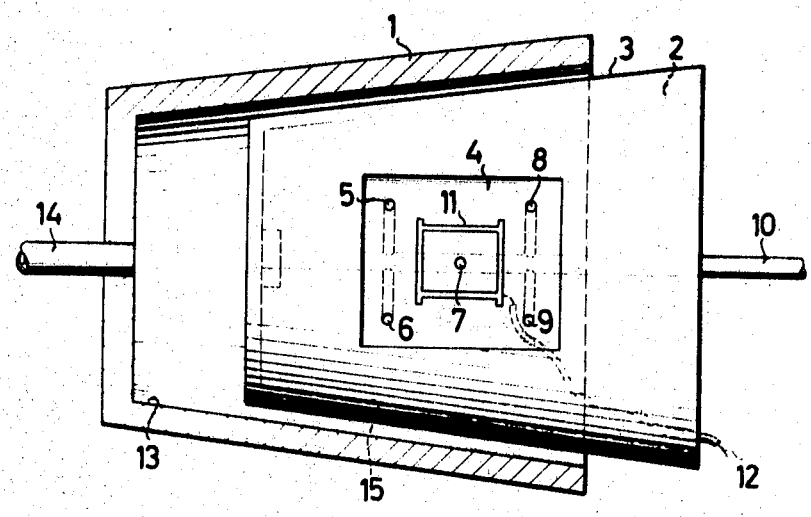
FIG. 1 is a schematic cross-sectional view of an apparatus according to the present invention.
Figure 2:
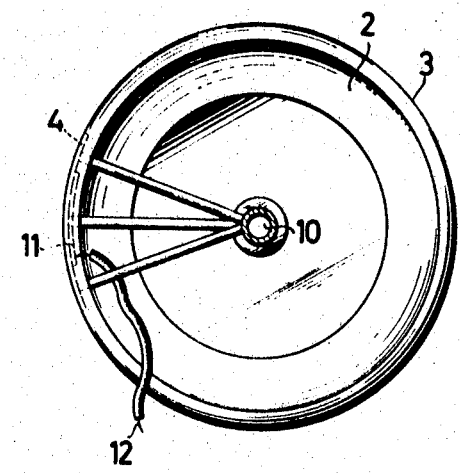
FIG. 2 is a schematic plan view taken from above of the inner member of FIG. 1.

Referring now to the drawing, and particularly to FIG. 1, it will be seen that the article mold portion 1 is a cup-shaped matrix of an injection mold. The corresponding patrix of the injection mold is not shown.

Into the matrix 1, an auxiliary member 2 is introduced which is also cup-shaped. In the outer face 3 of auxiliary member 2 a depression 4 is formed which corresponds to the size and shape of the foil which is to be transferred to the matrix 1 and eventually applied to the molded article. Conduits 5, 6, 7, 8 and 9 terminate in the depressed surface portion 4 and communicate with a central conduit 10 so that by connecting conduit 10 to a source of pneumatic pressure or to a vacuum pump, either suction or pressure will be applied to the foil located in depression 4. Furthermore, a metal strip 11 is arranged in the face of depression 4 and is connected to high-voltage conduit 12.

Reference numeral 14 denotes the inlet for material which is to be injection molded.

The method of the present invention may be carried out with reference to the drawing, in the following manner.

The foil which is to be applied to the molded article is placed into the depression 4 and by connecting conduit 10 to a vacuum pump, suction will be applied to the foil through conduits 5, 6, 7, 8 and 9 so that the foil will be fixed in its location. Thereafter, the high-voltage is switched on and the foil will be electrostatically charged by contact with metal strip 11. The auxiliary member 2 is then inserted completely into matrix 1 so that the foil will be juxtaposed to the surface portion of matrix 1 from which the foil is to be eventually transferred to the molded article. The vacuum pump is switched off and pneumatic pressure is applied through conduit 10 so that the compressed air emanating through conduits 5-9 will press the foil against the inner wall 13 of matrix 1 at which the foil will then adhere due to the electrostatic charging of the latter.

The pneumatic pressure is then switched off, auxiliary member 2 is withdrawn and the patrix (not shown) belonging to matrix 1 is inserted and then molding is carried out in conventional manner by introduction of the synthetic material through conduit 14.

If it is desired to apply the printed foil or the like to the inner wall of the molded article, the process described above is carried out in such a manner that depression 4 will be formed in the inner face 15 of auxiliary member 2 and auxiliary member 2 will be superposed over the patrix (not shown) which together with matrix 1 forms the molding arrangement.

It will be understood that each of the elements described above, or two or more together, may also find a useful application in other types of sheet transfer or molding arrangements differing from the types described above.

While the invention has been illustrated and described as embodied in a transfer arrangement particularly suitable in combination with an injection molding device for thermoplastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An apparatus for transferring a sheet from the surface of a first member within close tolerance to a predetermined portion of the surface of a second member, said apparatus comprising, in combination, a matrix member and a patrix member having complementary internal and external surfaces; positioning means on one of said surfaces for exactly positioning said sheet on a selected portion of said one surface, said positioning means comprising a depression in said one surface having an outline corresponding to the contour of the sheet and being formed with openings; means for removably holding said sheet in said depression and comprising suction means communicating with said openings for applying suction to a sheet located in said depression; electrostatic charging means at least partly located within said depression for electrostatically charging the sheet located therein; means for moving said members relative to each other so that said selected portion of the surface of said one member is juxtaposed with said predetermined portion of the surface of the other member; and means for transferring said sheet from said selected portion of said one surface to the juxtaposed portion of said other surface.

2. An apparatus as defined in claim 1, wherein said one of said surfaces forms part of said patrix member.

3. An apparatus as defined in claim 1, wherein said means for transferring include pneumatic pressure means operatively associated with said openings for applying pneumatic pressure against said sheet in the direction from said one surface toward the other of said surfaces.

References Cited

UNITED STATES PATENTS

| | | | |
|---|---|---|---|
| 3,270,101 | 8/1966 | Jardine et al. | 264—22 |
| 3,324,508 | 6/1967 | Dickinson | 264—22X |
| 1,764,009 | 6/1930 | Embree | 264—275X |
| 3,291,874 | 12/1966 | Negoro | 264—92X |
| 3,296,345 | 1/1967 | Dietz | 264—275X |
| 3,342,914 | 9/1967 | Edwards | 264—89 |

ROBERT F. WHITE, Primary Examiner

J. H. SILBAUGH, Assistant Examiner

U.S. Cl. X.R.

18—5, 5.3, 42; 264—22, 90, 255